United States Patent [19]
Virloget

[11] 3,908,441
[45] Sept. 30, 1975

[54] LEVEL DETECTING DEVICE

[75] Inventor: Jean M. Virloget, Le Mesnil Saint-Denis, France

[73] Assignee: Societe Francaise d'Instruments de Controle et d'Analyses, Saint-Denis, France

[22] Filed: May 21, 1973

[21] Appl. No.: 362,080

[30] Foreign Application Priority Data
June 2, 1972 France .......................... 72.19838

[52] U.S. Cl. ........................ 73/55; 73/293; 250/577
[51] Int. Cl.² ...................... G01N 11/06; G01F 23/00
[58] Field of Search ........ 73/55, 293; 250/573, 574, 250/575, 576, 577

[56] References Cited
UNITED STATES PATENTS

| | | | |
|---|---|---|---|
| 3,071,961 | 1/1963 | Heigl et al. | 73/55 |
| 3,549,893 | 12/1970 | Gibbs | 250/577 |
| 3,604,247 | 9/1971 | Gramain et al. | 73/55 |
| 3,636,360 | 1/1972 | Oishi et al. | 73/293 X |
| 3,699,560 | 10/1972 | Meunier et al. | 250/573 X |
| 3,713,328 | 1/1973 | Aritomi | 73/55 |
| 3,812,482 | 5/1974 | Clark | 250/573 X |

*Primary Examiner*—Richard C. Queisser
*Assistant Examiner*—Joseph W. Roskos
*Attorney, Agent, or Firm*—Waters, Schwartz & Nissen

[57] ABSTRACT

A device for detecting the level of a liquid in a transparent tube including a radiation source to be placed facing a region of the periphery of the tube and a photocell to be placed facing a second zone of the tube periphery to receive radiation totally reflected from the internal face of the tube which has been wetted by a liquid, and which contains air rather than liquid. The device may be embodied in an automatic viscometer especially for coloured or opaque liquids.

9 Claims, 6 Drawing Figures

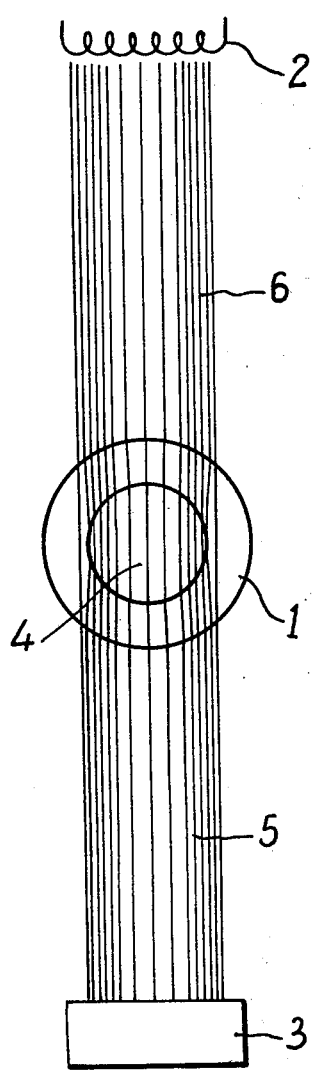
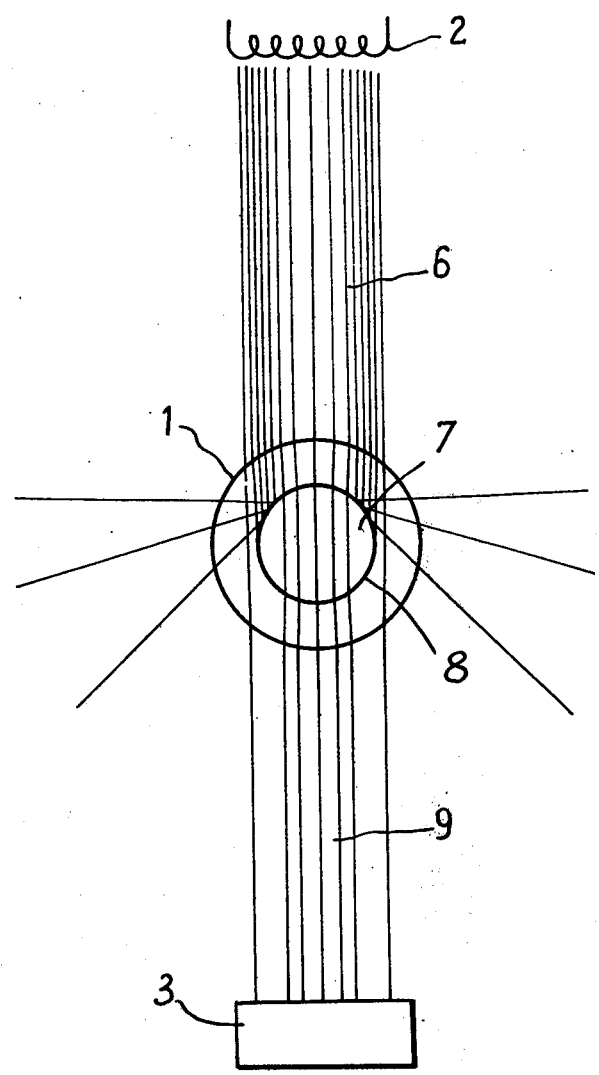
Fig. 1A PRIOR ART
Fig. 1B PRIOR ART

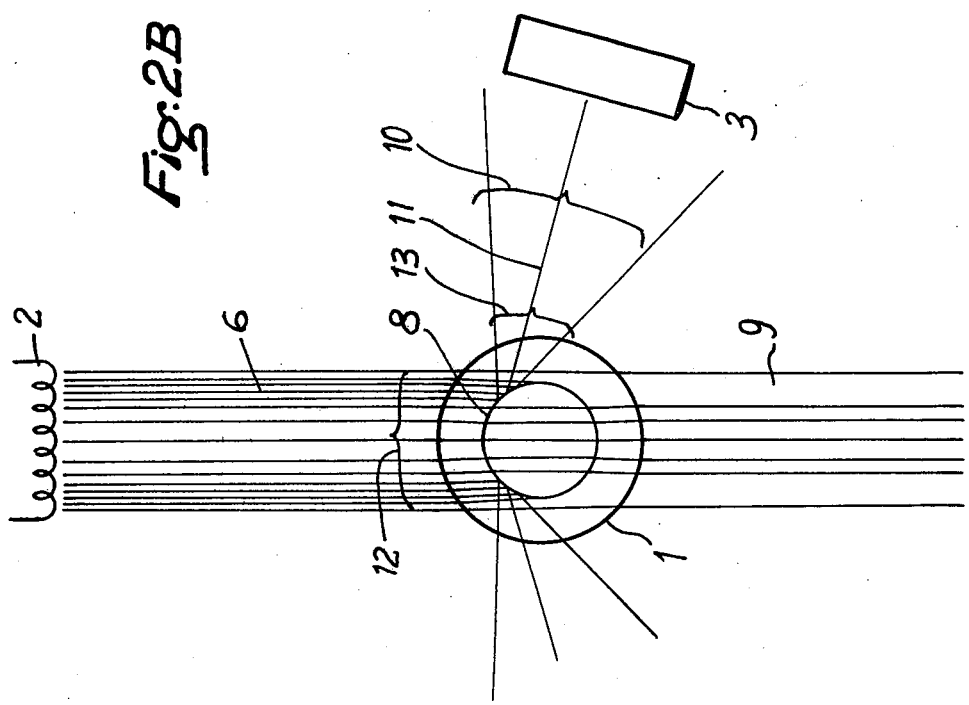
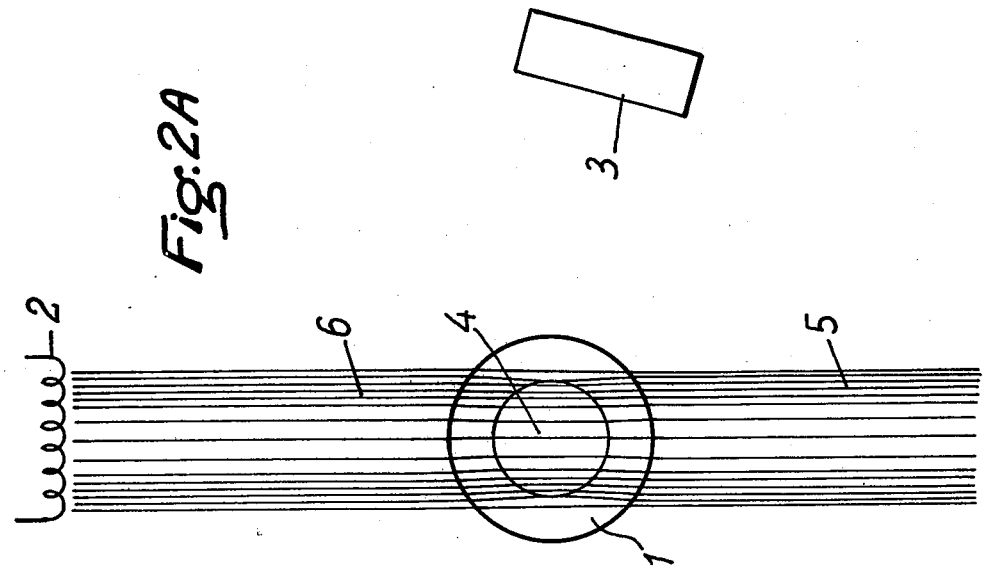

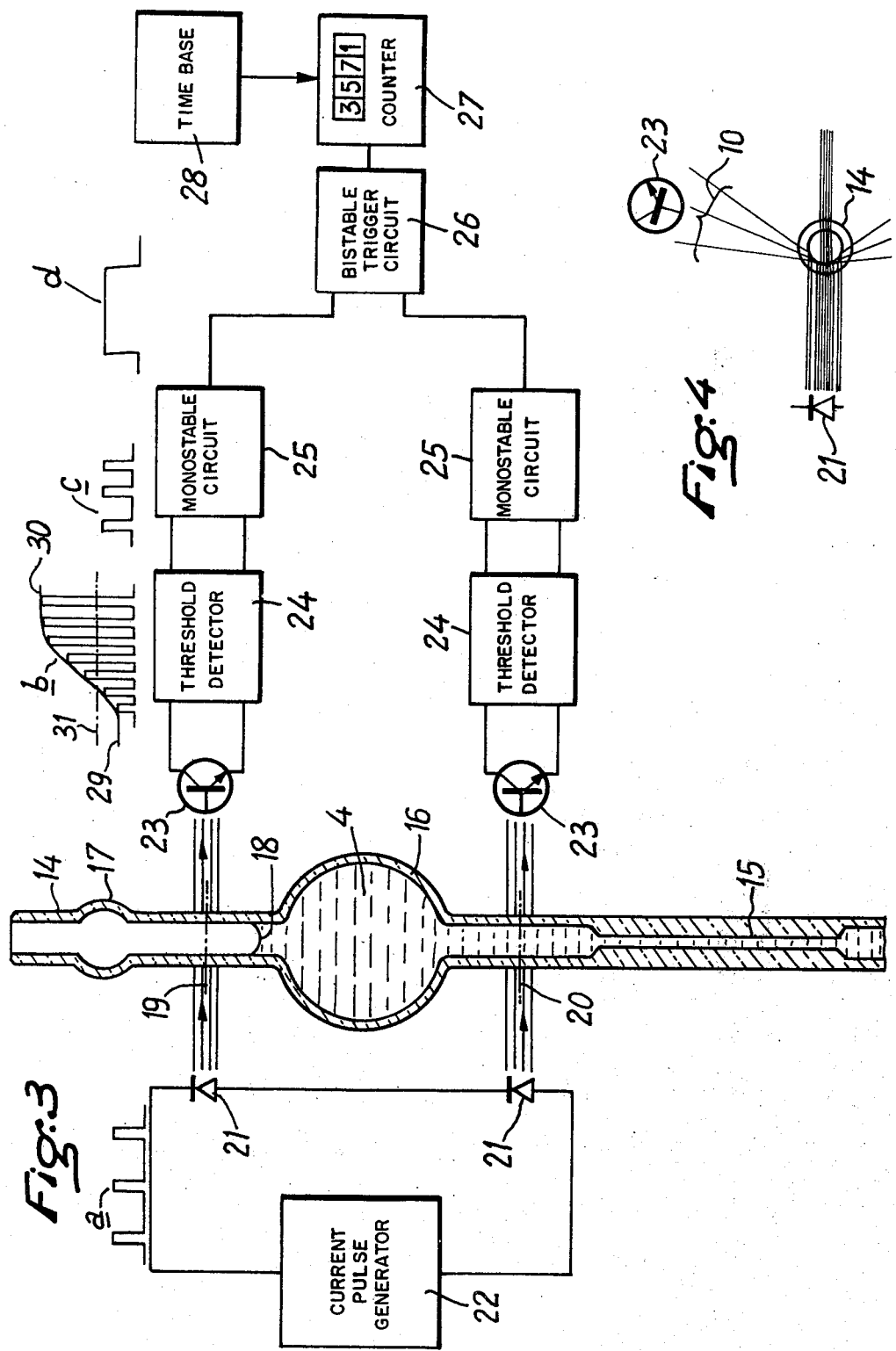

1

LEVEL DETECTING DEVICE

BACKGROUND OF THE INVENTION

1. Field of the Invention

This invention relates to devices for detecting the level of a liquid in a transparent tube. It is particularly suitable for use in capillary tube type automatic viscometers but it can also be used in other applications, where it is important to detect precisely the passage, at a given level, of the meniscus formed by a liquid in a transparent tube.

In the following explanation reference will be made to the use of such a device in an automatic viscometer, but this is only by way of example.

2. Description of the Prior Art

In the known automatic viscometers the viscosity of a flowing liquid is measured by timing its flow through a capillary tube, the volume of the liquid being known. The duration of this flow is itself measured by detection of the passage through a first level and a second level of the meniscus formed by the liquid flowing in a transparent tube.

The passage of the meniscus through the two levels is detected by photoelectric cells disposed close to the transparent tube at a point diametrically opposite a continuously emitting radiation source, such as an electric lamp.

Reception of the radiation by the photoelectric cells is based on direct transmission through the tube. When the tube contains liquid whose refractive index is distinctly nearer the refractive index of the glass than that of air, a substantial fraction of the radiation passes straight through the tube and the liquid and falls on the photoelectric cell.

If the tube no longer contains liquid but is filled with air, the refractive index of which is far from that of the glass, a large fraction of the radiation is reflected by the internal surface of the glass so that the fraction which is transmitted directly through the tube is considerably reduced.

In general, in the known viscometers, the ratio between the value of the signal delivered by the cell in the first case (liquid present in the tube) and that of the signal delivered in the second case (liquid absent from the tube) is 3/1. Such a ratio can easily be disturbed by the light in the surroundings which is often variable; moreover when the liquid concerned is colored, or opaque, or very viscous, the fraction of radiation transmitted directly through the tube is inevitably reduced because of absorption by the liquid. Often this reduction is such that the above-mentioned ratio is no longer obtained. In fact it is impossible for this reason, with the known viscometers using direct transmission of the radiation, to measure the viscosity of colored, opaque, or very viscous liquids.

SUMMARY OF THE INVENTION

A main object of the invention is to provide a level detector which can be used in automatic viscometers and is capable of detecting the presence or absence in a transparent tube not only of a transparent liquid but also of a coloured, very absorbent and even completely opaque liquid.

Another object of the invention is to provide a detector for the level of a liquid in a transparent tube which is much less sensitive than the known instruments to disturbance due to variations in the surrounding lighting or to the ageing of the radiation emission and receiving elements.

The invention contemplates a liquid level detection device which includes a transparent tube for containing a liquid which forms a meniscus in the tube. A radiation source is placed facing the periphery of the tube and a photoelectric device faces the periphery of the same part of the tube but is angularly offset with respect to the light from the source incident on the tube, and receives light reflected from the internal surface of the tube when no liquid is present.

BRIEF DESCRIPTION OF THE DRAWINGS

FIG. 1A and FIG. 1B are diagrammatic views showing the arrangement of known detection devices, FIG. 2A and FIG. 2B are diagrammatic views showing the operation of a detection device according to the invention, FIG. 3 is a simplified general view of a detector according to the invention forming part of an automatic viscometer, FIG. 4 is a detailed view from above of a part of the viscometer of FIG. 3.

DESCRIPTION OF THE PREFERRED EMBODIMENTS

The purpose of FIGS. 1A and 1B is to bring out more clearly the novelty, advantages and advance of the invention by comparison with the conventional detection devices shown in diagrammatic form in these figures.

On either side of a glass tube 1 are disposed, facing and diametrically opposite, a light source 2 and a photoelectric cell 3.

When the tube 1 contains a transparent liquid 4, the refractive index of the glass used being of the order of 1.5 and that of the liquid quite close to this (the index for paraffin oil being 1.43 and that of water 1.33), a large proportion 5 of the beam 6 emitted by the source 2 reaches the cell 3 direct by, through the tube 1 and the liquid 4.

On the other hand when the tube 1 contains air 7 (FIG. 1B), the refractive index 1 of which differs greatly from the index 1.5 of the glass, the beam 6 is largely reflected on the internal surface 8 of the tube 1. The beam 9 received by the cell 3 is greatly reduced.

The diminution in the intensity of the beam received by the cell 3 is also produced with an opaque liquid or one that is colored or highly viscous. The main cause of this diminution is the absorption by the liquid of a fraction of the beam 6. Once this absorption reaches 50 percent detection is no longer possible. However in this case there is not a great amount of total reflection, as in FIG. 1B, since the tube contains a liquid and not air.

It was found, surprisingly, that the total reflection at the interface 8 between glass and air, or at the interface between the residual liquid and air when the inner surface of the tube is left wet after the passage of a liquid, creates in the same zone 10 (see FIG. 2B) a reflected beam 11 which can be detected on each side of the tube.

In relation to a first zone 12 of the periphery of the tube 1 where the radiation beam 6 is incident, the reflected beam 11 comes from a second zone 13 displaced by an angle of approximately 105° relative to the first zone.

Thus the cell 3 is disposed, in accordance with the invention, in the region 10 opposite the second zone 13.

With this arrangement, when the tube 1 contains a liquid 4 (FIG. 2A) there is no reflection and no radiation is received by the cell 3. Under these conditions it is immaterial whether the liquid is transparent, or deeply colored or even completely opaque.

The manner of functioning is thus of the "all or nothing" kind, whereas with the conventional detection devices it is of the "all or little" kind. With the latter it is necessary to provide a means of adjustment in order to set the detection point between the maximum beam 5 and the minimum beam 9. The latter is easily disturbed by surrounding lighting, ageing of the elements, tolerances and manufacturing inequalities.

In the device according to the invention, these disturbing factors are eliminated by setting the point of detection at a value equivalent to 1/4 of the maximum beam, for example.

Since the reflected beam 11 is of rather low intensity it is preferably to use a more powerful light source 2 or to condense this beam by known optical means.

It is advantageous, according to the invention, in contradistinction to the conventional devices to use a pulsed source forming part of a circuit comprising a current pulse generator. This gives the advantage of even greater freedom for the device from environmental disturbances.

To describe this part of the invention, reference will be made to FIGS. 3 and 4 which demonstrate the use of two detecting devices according to the invention in an automatic viscometer for all liquids, whether transparent or opaque.

The known parts of this viscometer have not been shown in the drawings and will not be described. All that has been illustrated is a viscometric tube 14 of glass which has a capillary tube 15 below a first measuring bulb 16 above which is a guard bulb 17.

The tube 14 contains a liquid 4 the surface of which terminates in a meniscus 18. The speed of flow of the liquid 4 in the capillary tube 15, that is to say its viscosity is determined by measuring the time taken by the meniscus 18 to pass from a first level 19 to a second level 20.

Two light emitting diodes 21 are disposed at levels 19 and 20. These are obtainable commercially and they form part of a circuit comprising a current pulse generator 22. These diodes are preferably of gallium arsenide, emitting an infrared radiation of 9,000 A, which is not likely to create troublesome fluorescence.

The pulses have a duration of the order of a few microseconds for a period of 1 to 5 milliseconds; for example the method of operation may be 10 microsecond pulses for each millisecond period or 5 microsecond pulses for each period of 5 milliseconds.

The use of pulses makes it possible to obtain an intense beam 11 while dissipating only a limited power.

Of course it is possible to make use of means equivalent to those just described and to modify the duration and the frequency of the pulses depending on the requirements of the measurement which is to be carried out.

In one of the two regions 10 (see FIG. 4) relative to the diode 21, at each level 19, 20 there is disposed a phototransistor 23 which is sensitive to the pulses emitted by the corresponding diode 21. The use of this transistor is not essential to the invention. It would be possible to make use of any equivalent photoelectronic element for pulse detection.

In the viscometer described, each phototransistor 23 is associated with a pulse transmission capacitor and with a threshold detector 24 connected to a monostable circuit 25. The two monostable circuits 25 which transform the pulses into the "1" or "O" state are together connected to a bistable trigger circuit 26 which in turn is connected to a counter 27 associated with a time base 28.

The pulses emitted by the light emitting diodes 21 are shown diagrammatically at $a$ by square waves.

In the absence of receipt of any luminous pulses, the phototransistors 23 deliver a current with a substantially constant level 29 due to their own dark current and to the surrounding parasitic lighting. This almost constant current is not transmitted by the capacitors. On receiving the pulses the phototransistors 23 deliver a level signal 30, shown diagrammatically which is much higher and can be transmitted easily through a capacitor. This makes it possible to separate the useful signal from the effect of the surrounding parasitic light and the temperature variations which influence the transistors.

The useful signal can be detected at a threshold 31. The detector 24 emits a signal $c$ which the circuit 25 transforms into a signal $d$ which is capable of changing the state of the oscillator 26. By means of the counter 27 it is possible to measure automatically and precisely the length of time taken for the meniscus 18 to move from level 19 to level 20.

If it is only required to monitor a single level of a liquid by means of a device according to the invention the signal $d$ emitted by the circuit 25 is used in other ways, for example to control the running or the stopping of a motor-pump set.

I claim:

1. A device for detecting the level of a liquid in a tube at least at a predetermined region of the tube, said device comprising a transparent tube containing a liquid which is displaced in the tube and which forms a displaceable meniscus in the tube, a radiation source disposed on one side of the tube with regard to the predetermined region thereof, said radiation source comprising means for emitting light impulses incident on a first zone of the periphery of the tube at said predetermined region, the emitting means comprising a pulse source including a circuit containing a current pulse generator means, a photo-electric cell sensitive to the presence and absence of said light impulses located in facing relation with a second zone of the periphery of the tube in said region for receiving that fraction of the radiation which has undergone total reflection in proximity with the internal face of the tube when the tube contains air instead of liquid.

2. A device as claimed in claim 1 wherein the emitted light impulses are in the infrared band.

3. A device as claimed in claim 1 wherein the means for emitting light impulses is operable to emit pulses having a duration of the order of a few micro-seconds for a period of from one to five milliseconds.

4. A device as claimed in claim 1 wherein the means for emitting light impulses comprises a diode of a gallium arsenide emitting radiation at 9000 A.

5. A device as claimed in claim 1 wherein the photoelectric cell comprises a phototransistor and a pulse transmission capacitor coupled to the phototransistor.

6. A device as claimed in claim 1 wherein the emitting means further comprises a light emitting diode.

7. An automatic viscometer comprising a transparent tube containing a liqued which is displaced in the tube and which forms a displaceable meniscus in the tube, means for detecting the passage of the meniscus at an upper and a lower level in said tube comprising a first radiation source at the upper level of the tube, a second radiation source at the lower level in the tube, each radiation source comprising means for emitting light impulses at the periphery of the tube at said respective levels, each emitting means comprising a pulse source including a circuit containing a current pulse generator means, each of said emitting means being operable to emit impulses having a duration of the order of a few microseconds for a period of from one to five milliseconds, a photoelectric cell at each of said levels associated with a respective radiation source and sensitive to the absence and presence of light impulses from said source, each cell being in facing relation with said tube in a portion of the periphery thereof angularly offset from the portion facing the associated radiation source for receiving that fraction of the radiation which has undergone total reflection at the internal face of the tube when the tube contains air instead of liquid, each photoelectric cell comprising a phototransistor and a pulse transmission capacitor connected to the phototransistor, said viscometer further comprising a monstable circuit connected to both of the monstable circuits and a counter, associated with a time base, conected to said bistable trigger curcuits.

8. A viscometer as claimed in claim 7 wherein the emitted light impulses are in the infrared band.

9. A viscometer as claimed in claim 7 wherein the means for emitting light impulses further comprises a diode of a gallium arsenide emitting radiation at 9000A.

* * * * *